(12) United States Patent
Mishra et al.

(10) Patent No.: US 11,864,055 B2
(45) Date of Patent: Jan. 2, 2024

(54) METHOD OF DETERMINING LOCATION OF MOBILE DEVICE AND SYSTEM FOR USING THE SAME

(71) Applicant: Rakuten Symphony Singapore Pte. Ltd., Singapore (SG)

(72) Inventors: Tarun Mishra, Madhya Pradesh (IN); Sachin Choudhary, Madhya Pradesh (IN); Sonam Basiya, Madhya Pradesh (IN); Priyank Kasera, Madhya Pradesh (IN)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 200 days.

(21) Appl. No.: 17/643,595

(22) Filed: Dec. 10, 2021

(65) Prior Publication Data
US 2023/0188929 A1   Jun. 15, 2023

(51) Int. Cl.
*H04W 4/02* (2018.01)
*G01S 19/25* (2010.01)
*H04W 4/021* (2018.01)
*H04W 4/029* (2018.01)

(52) U.S. Cl.
CPC ............. *H04W 4/023* (2013.01); *G01S 19/25* (2013.01); *H04W 4/021* (2013.01); *H04W 4/029* (2018.02)

(58) Field of Classification Search
CPC ... H04W 4/02; H04W 4/029; H04W 52/0254; H04W 4/025; H04W 4/021; H04W 4/33; H04W 4/38; H04W 52/0251; H04W 64/00; H04W 4/023; G01S 5/10; G01S 19/25
See application file for complete search history.

(56) References Cited

U.S. PATENT DOCUMENTS

| | | | |
|---|---|---|---|
| 9,584,966 B1 * | 2/2017 | Thiel | H04W 4/02 |
| 2007/0085673 A1 * | 4/2007 | Krumm | H04M 1/72454 340/521 |
| 2013/0131973 A1 * | 5/2013 | Friedler | G01S 19/48 701/408 |
| 2014/0179298 A1 * | 6/2014 | Grokop | H04W 4/029 455/418 |

(Continued)

FOREIGN PATENT DOCUMENTS

| | | | | |
|---|---|---|---|---|
| CN | 110220550 A | * | 9/2019 | |
| WO | WO-2016044115 A1 | * | 3/2016 | G01C 21/206 |

*Primary Examiner* — Dung Hong
(74) *Attorney, Agent, or Firm* — HAUPTMAN HAM, LLP

(57) ABSTRACT

A mobile device includes a plurality of sensors; a non-transitory computer readable medium configured to store instructions; and a processor. The processor is configured to execute the instructions for receiving first sensor data from a first sensor; and determining whether the mobile device is outdoors based on the received first sensor data and a first threshold. The processor is configured to execute the instructions for receiving second sensor data from a second sensor, wherein the second sensor is different from the first sensor; and determining whether the mobile device is outdoors based the received second data and a second threshold. The processor is further configured to execute the instructions for determining a confidence level of a determination of whether the mobile device is outdoors based on which sensor of the plurality of sensors is used to determine whether the mobile device is outdoors.

20 Claims, 4 Drawing Sheets

(56) References Cited

U.S. PATENT DOCUMENTS

| | | | | |
|---|---|---|---|---|
| 2015/0097731 A1* | 4/2015 | Russell | .................. | G01S 5/012 |
| | | | | 342/450 |
| 2017/0366943 A1* | 12/2017 | Yoon | .................... | H04W 4/025 |
| 2018/0322653 A1* | 11/2018 | Tatarnikov | ........... | G06V 30/224 |
| 2021/0176726 A1* | 6/2021 | Vyunova | ............... | H04W 64/00 |

* cited by examiner

METHOD OF DETERMINING LOCATION OF MOBILE DEVICE AND SYSTEM FOR USING THE SAME

BACKGROUND

Telecommunication service providers attract users based on coverage maps showing large coverage areas with high connectivity. These coverage maps provide information related to measured service outdoors. Buildings are known to block telecommunication signals, which impacts service to users located indoors. Users often experience reduced coverage when located indoors. In some instances, users will contact the telecommunication provider with complaints regarding coverage while the user is located indoors.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
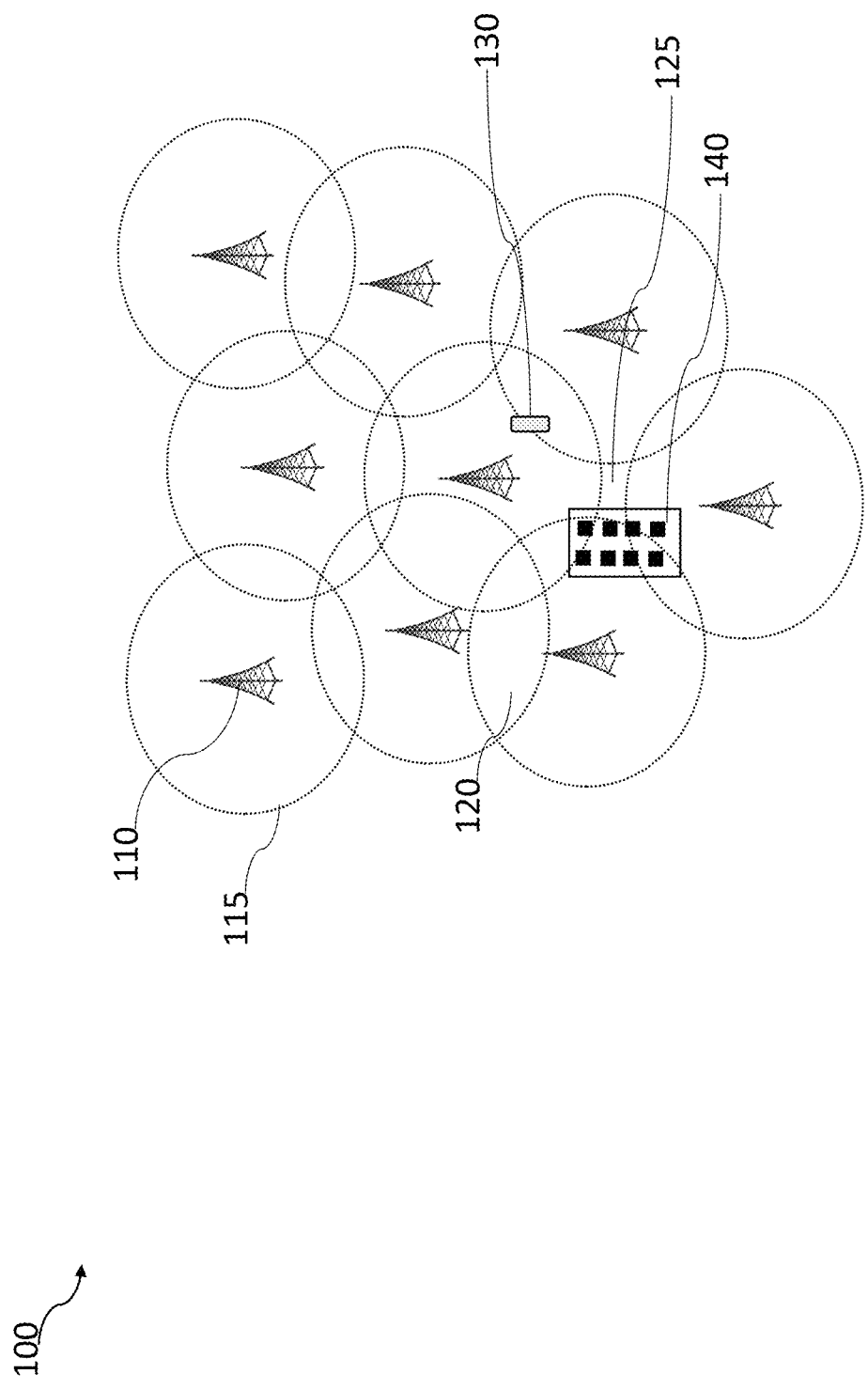
FIG. 1 is a schematic diagram of a telecommunication network in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When a telecommunication service providers are made aware of a service related issue with a mobile device, the telecommunication service provider seeks to address the service issue to improve customer satisfaction. In some instances, the service provider is made aware of the problem by receiving a communication from a customer. In some instances, the service provider is made aware of the problem based on a detected decrease in communication between the mobile device and network equipment, such as a base station or other such equipment. In some instances, key performance indicators (KPIs) are monitored by the telecommunication network to determine a quality of a connection to the mobile device. In response to the KPIs indicating poor or no connectivity to the mobile device, the service provider is able to detect a problem with the service to the mobile device.

In some instances, the service issues are not directly related to the telecommunication network. For example, when the mobile device is inside a building, the building will block a portion of the signal between the mobile device and the telecommunication network. Therefore, in some instances, the service issues result from the building blocking signal rather than a problem with the telecommunication network. If the service provider is made aware of a service issue when the mobile device is indoors and dispatches a service team to fix the network, a risk of wasting time and expenses increases leading to reduced efficiency in maintaining the network. If the service provider is made aware of a service issue and the issue goes unresolved for an extended period of time, customer satisfaction will be reduced and a risk of losing customers increases.

In order to know whether the mobile device is indoors, the service provider would speak to the user. However, such calls to the user also increase the risk of reduced customer satisfaction; and reduce efficiency in maintaining the network. In some embodiments of this description, the mobile device is able to automatically determine whether the mobile device is located indoors or outdoors and provide this information to the service provider without user interaction. This helps the service provider to improve efficiency in maintaining the network and maintaining or increasing customer satisfaction.

FIG. 1 is a schematic diagram of a telecommunication network 100 in accordance with some embodiments. The telecommunication network 100 includes a plurality of base stations 110 and each base station 110 has a corresponding coverage area 115. In some instances, cover areas 115 for neighboring base stations 110 overlap one another to define an overlapping coverage area 120. In some instances, a gap 125 exists between coverage areas 115 of neighboring base stations 110. A mobile device 130 within the telecommunication network 100 is able to connect to one or more base station 110 when the mobile device 130 is within the coverage area 115 corresponding to the base station 110. In some instances, a building 140 is within the telecommunication network 100. The building 140 tends to block signals from the base stations 110 to some degree. As a result, in a situation where the mobile device 130 is located within the building 140, the mobile device 130 is likely to experience reduced connectivity to base stations 110 than if the mobile device 130 is outdoors.

A telecommunication service provider is responsible for maintaining the base stations 110 and minimizing a size and number of gaps 125 in the coverage areas 115 of the telecommunication network 100. In some embodiments, the service provider becomes aware of a connectivity issue with the mobile device 130. In some embodiments, the service provider becomes aware of the connectivity issue through communication with a user of the mobile device 130. In some embodiments, the service provider becomes aware of the connectivity issue through monitoring of KPIs within the telecommunication network 100, or through other monitored parameters. If the mobile device 130 is within the gap 125, the service provider is likely to provide instructions for service or maintenance of one of more base stations 110 adjacent to the gap 125 in order to reduce or remove the gap 125 from the telecommunication network 100. However, if the mobile device 130 is within the building 140 while the service provider becomes aware of the connectivity issue with the mobile device, a risk increases that dispatching a service or maintenance team to the adjacent base stations 110 is a waste of time or resource because the cause of the connectivity issue is the building 140 blocking signals from the telecommunication network 100. In some embodiments, the service provider is able to use information, e.g., collected using method 200 (FIG. 2), from the mobile device 130 to determine whether the mobile device 130 is located within the building 140 in order to make a more informed decision regarding whether to dispatch the service or maintenance team.

Figure 2:
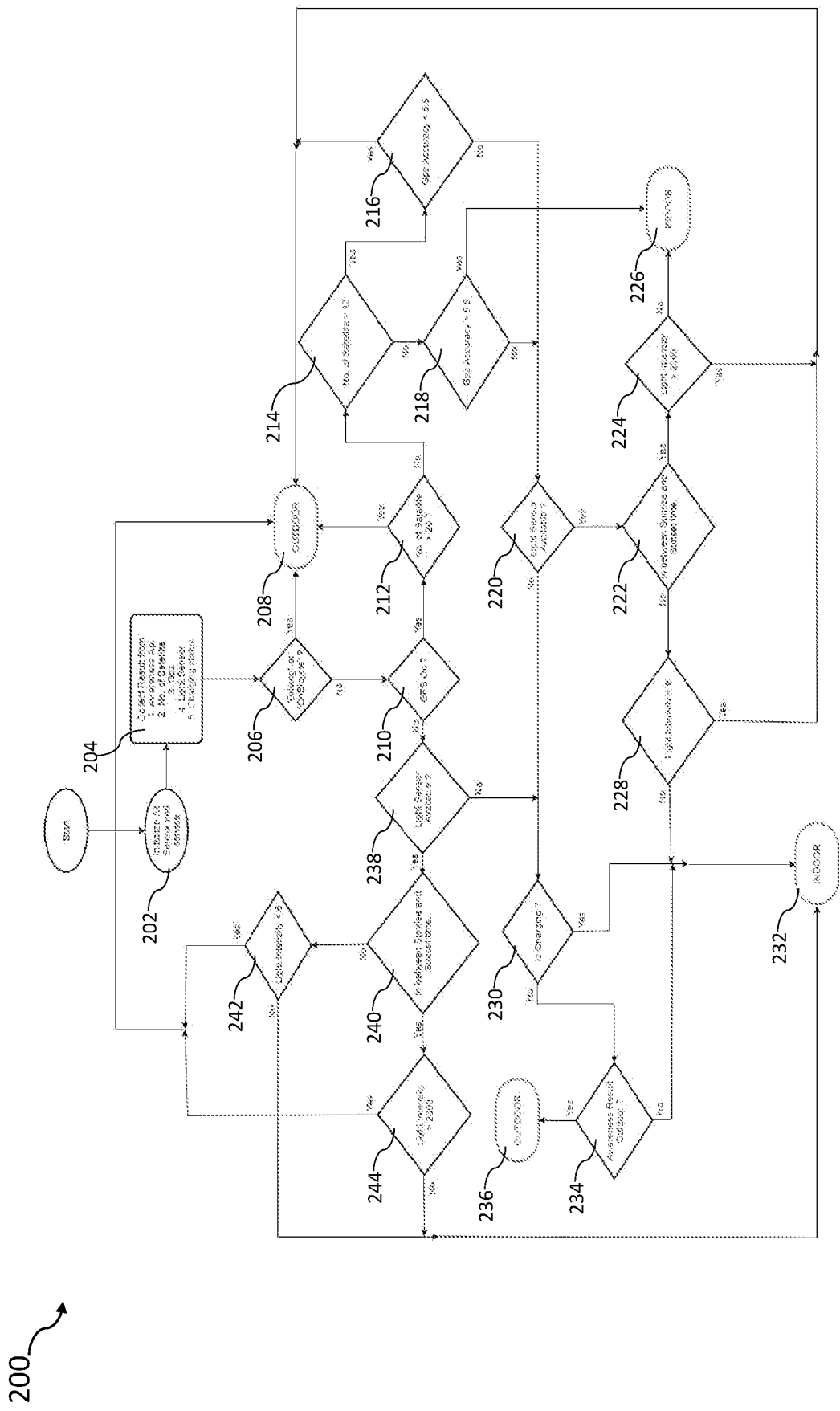
FIG. 2 is a flowchart of a method of determining whether a mobile device is located indoors or outdoors in accordance with some embodiments.

FIG. 2 is a flowchart of a method 200 of determining whether a mobile device is located indoors or outdoors in accordance with some embodiments. In some embodiments, the method 200 is usable by a telecommunication service provider, e.g., service provider of telecommunication network 100 (FIG. 1), in order to determine whether service or maintenance on the network is likely warranted. The method 200 is able to provide information to the service provider based on collecting data from the mobile device. The method 200 provides both a result of a determination of indoors or outdoors as well as a confidence level in the opinion. This allows the service provider to make more informed decisions regarding whether service or maintenance of the network is warranted. In some embodiments, the method 200 is implemented using an application installed on the mobile device. In some embodiments, the method 200 is implemented by collecting data by the mobile device and then transmitting the data to an external device, such as a server, for processing of the data. In some embodiments, some collected data is processed by the mobile device and some collected data is processed by an external device.

The method 200 includes operation 202 in which sensors and service within the mobile device are initialized. In some embodiments, initialization of the sensors of the mobile device includes performing diagnostics on the sensors to determine whether the sensors are working properly in order to help ensure that data collected from the sensors is reliable. In some embodiments, initialization of the service includes measuring a connectivity level of the mobile device to the telecommunication network, e.g., the telecommunication network 100 (FIG. 1), or any other networks, such as wireless fidelity (WiFi) networks, available to the mobile device. In some embodiments, initialization of the service includes performing diagnostics on an antenna of the mobile device.

The method 200 includes operation 204 in which data is collected from sensors in the mobile device. The data includes data related to movement of the mobile device; data related to a number of satellites that the mobile device is able to detect; data related to a location of the mobile device, e.g., using a global positioning system (GPS); data related to an amount of light detected by the mobile device; and data related to a charging status of the mobile device. In some embodiments, thresholds used for determining a whether the data indicates the mobile device being indoors or outdoors are adjusted based on a time of day.

The data related to movement of the mobile device is usable to determine a speed of movement of the mobile device in order to determine whether such a speed of movement is likely to occur indoors. In some embodiments, the data related to movement of the mobile device is detected using an Awareness application program interface (API). In some embodiments, the Awareness API is installed on the mobile device prior to implementation of the method 200. In some embodiments, the data related to movement of the mobile device is detected using other sensors, such as an accelerometer, a gyroscope, a GPS, or another suitable sensor.

The data related to a number of satellites detectable by the mobile device is usable to determine whether a roof of a building, e.g., building 140 (FIG. 1), is blocking the ability of the mobile device to detect satellites. As discussed above, buildings often block signals, so a mobile device which is unable to detect any satellites or only a small number of satellites is likely to be indoors. In some embodiments, the number of satellites detectable by the mobile device is determined based on connectivity parameters detected by the mobile device.

The data related to GPS is usable to determine whether a detected location of the mobile device coincides with a known building location. In addition, an accuracy of a location of the mobile device able to be determined using the GPS is also indicative of whether the mobile device is indoors. In some embodiments, the GPS is determined using applications and sensors within the mobile device in order to determine a distance between the mobile device and multiple known locations.

The data related to the amount of light detected by the mobile device is usable to determine whether the amount of light being detected by the mobile device is consistent with a time of day where the mobile device is located. In some embodiments, the amount of light is detected using a photodetector, a camera or another suitable sensor within the mobile device. In some embodiments, a time of day where the mobile device is location is determined based on information received from a telecommunication network, e.g., telecommunication network 100 (FIG. 1), accessible by the mobile device.

The data related to charging status of the mobile device is usable to determine whether the mobile device is connected to an electrical power source having a power density higher than a portable charger. In some embodiments, the charging status of the mobile device is detected using a charging detector, a charging rate of the mobile device or another suitable sensor within the mobile device.

The method 200 includes operation 206 in which a determination is made regarding whether the mobile device is likely carried by a user that is driving or bicycling. The determination is made regarding whether the mobile device is likely being carried by a user that is driving or bicycle based on a rate of movement of the mobile device. For example a velocity or an acceleration of the mobile device above a value that is achievable by running is likely to indicate that the user carrying the mobile device is either riding a bicycle or riding in a vehicle. While the term "driving" is used, one of ordinary skill in the art would recognize that riding in a vehicle is also contemplated by this disclosure. In some embodiments, the user is determined to be bicycling or driving in response to the mobile device measuring a speed of more than 10 meters per second (m/s).

In some embodiments, the method 200 proceeds to operation 208 in response to a determination that the mobile device is carried by a user that is bicycling or driving. In some embodiments, the method 200 proceeds to operation 210 in response to a determination that the mobile device is carried by a user that is not bicycling or driving. In some embodiments, the method 200 stores information related to a determination that the mobile device is outdoors based on operation 208 while also proceeding to the operation 210 to analyze more of the collected data to adjust a confidence level of a determination of indoor/outdoor status of the mobile device. Performing both operation 208 as well as operation 210 following operation 206 increases a processing load on the mobile device, or external device, for analyzing the collected data; however, a precision of the indoor/outdoor status determination is increased. Although this description is not repeated for every instance of determining a location of the mobile device, e.g., indoors or outdoors, one of ordinary skill in the art would recognize that proceeding with the method 200 to increase confidence level at any point is within the scope of this disclosure according to some embodiments.

In operation 208, the method 200 determines that the mobile device is located outdoors. In response to the method 200 proceeding to the operation 208 from the operation 206 the determination of the mobile device being outdoors is made with a high level of confidence.

The method 200 further includes operation 210 in which a determination is made regarding whether a GPS of the mobile device is on. In some embodiments, the determination is made that the GPS is on in response to the user granting access to the GPS for an application on the mobile device used for determining whether the mobile device is indoors or outdoors. In some embodiments, the determination is made that the GPS is on in response to determining a timing of a most recent updating of the position of the mobile device in an application other than the application for determining whether the mobile device is indoors or outdoors.

In response to a determination that the GPS of the mobile device is on, the method 200 proceeds to operation 212. In response to a determination that the GPS of the mobile device is off, the method 200 proceeds to operation 238.

In operation 212, a determination is made regarding how many satellites the mobile device is able to detect and the number of satellites is compared with a first threshold number of satellites. In some embodiments, the first threshold number of satellites is determined based on a known location of the mobile device, based on the GPS. One of ordinary skill in the art would recognize that some locations have less satellite coverage due to lower populations than other locations. In some embodiments, the first threshold number of satellite is determined based on a time of day. One of ordinary skill in the art would recognize that in some instances a higher number of satellites are available to support telecommunications during daytime in order to support an increased volume of communication in comparison with a number of satellites available during nighttime. In some embodiments, the first threshold number of satellites during the daytime is twenty (20) satellites. In some embodiments, the first threshold number of satellites during the nighttime is seven (7).

In response to a determination that the number of satellites detectable by the mobile device is greater the first threshold number of satellites, the method 200 proceeds to operation 208 in which the mobile device is determined to be outdoors. In operation 208 coming from operation 212, the outdoor determination is made with a high level of confidence. In response to a determination that the number of satellites detectable by the mobile device is less than or equal to the first threshold number of satellites, the method 200 proceeds to operation 214.

In operation 214, the number of satellites detectable by the mobile device is compared with a second threshold number of satellites. The second threshold number of satellites is less than the first threshold number of satellites. In some embodiments, the second threshold number of satellites is independent of a time of day. In some embodiments, the second threshold number of satellites is different between daytime and nighttime. In some embodiments, the second threshold number of satellites is 12.

In response to a determination that the number of satellites detectable by the mobile device is greater than the second threshold number of satellites, the method 200 proceeds to operation 216. In response to a determination that the number of satellites detectable by the mobile device is less than or equal to the second threshold number of satellites the method 200 proceeds to operation 218.

In operation 216, an accuracy of a GPS location of the mobile device is determined and compare with a GPS accuracy threshold. The accuracy of the GPS location is increased as a number of known locations used to determine the location of the mobile device increases. One of ordinary skill in the art would expect that a greater number of detectable signals from known locations would increase when the mobile device is outdoors in comparison to when the mobile device is indoors. In some embodiments, the GPS accuracy is determined based on a location of the mobile device. As discussed above with respect to the number of satellites, one of ordinary skill in the art would understand that fewer signals from known locations would be detectable in less populated or rural areas. In comparison with the GPS accuracy threshold, a lower GPS accuracy means that the location of the mobile device is able to be determined with confidence within a smaller range of error. For example, an accuracy of 10 meters (m) would be considered less accurate than an accuracy of 5 m. In some embodiments, the GPS accuracy threshold is 5.8 m. In some embodiments, the GPS accuracy threshold is 10 m.

In response to a determination in operation 216 that the accuracy of the GPS location of the mobile device is less than, accurate to a smaller error, the GPS accuracy threshold, the method 200 proceeds to operation 208 and the mobile device is determined to be outdoors. In operation 208 coming from operation 216, the determination of the mobile device being outdoors is made with a medium confidence. In response to a determination in operation 216 that the accuracy of the GPS location of the mobile device is greater than, accurate to a larger error, or equal to the GPS accuracy threshold, the method 200 proceeds to operation 220.

In operation 218, the accuracy of the GPS location of the mobile device is also compared with the GPS accuracy threshold. In some embodiments, the GPS accuracy threshold used in operation 216 has a same value as the GPS accuracy threshold used in operation 218. In some embodiments, the GPS accuracy threshold used in operation 216 is different from the GPS accuracy threshold used in 218. In some embodiments, the GPS accuracy threshold is 5.8 m. In some embodiments, the GPS accuracy threshold is 10 m.

In response to a determination in operation 218 that the accuracy of the GPS location of the mobile device is less than, accurate to a smaller error, the GPS accuracy threshold, the method 200 proceeds to operation 220. In response to a determination in operation 218 that the accuracy of the GPS location of the mobile device is greater than, accurate to a larger error, or equal to the GPS accuracy threshold, the method 200 proceeds to operation 226 and the mobile device is determined to be indoors. In operation 208 coming from operation 218, the determination of the mobile device being indoors is made with a medium confidence.

In operation 220, a determination is made regarding whether a light sensor of the mobile device is available. In some embodiments, the determination regarding whether the light sensor is available is made in response to the user granting access to the GPS for an application on the mobile device used for determining whether the mobile device is indoors or outdoors. In some embodiments, the determination regarding whether the light sensor is available is made based on testing the light sensor of the mobile device to determine whether any light is detected.

In response to a determination that the light sensor of the mobile device is available, the method 200 proceeds to operation 222. In response to a determination that the light sensor of the mobile device is not available, the method 200 proceeds to operation 230.

In operation 222, a determination is made regarding a time of day at the location of the mobile device. The determination related to the time of day is usable to determine whether a mobile device outdoors would be expected to detect sunlight. In some embodiments, the determination is made based on a time at the location of the mobile device as well as sunrise and sunset times at the location of the mobile device. In some embodiments, the determination takes into account predicted whether in the location of the mobile device. In some embodiments, the predicted weather at the location of the mobile device used to adjust a confidence of a determination of indoors or outdoors.

In response to a determination of expected detection of sunshine, the method 200 proceeds to operation 224. In response to a determination of no expected detection of sunshine, the method 200 proceeds to operation 228.

In operation 224, an amount of light detected by the light sensor is compared with a first light intensity threshold. In some embodiments, the light sensor includes a photodetector or other suitable light detecting sensor. In some embodiments, the first light intensity threshold is adjusted based on predicted weather at the location of the mobile device. In some embodiments, the first light intensity threshold is two-thousand (2,000) lux.

In response to a determination that the light detected by the light sensor is less than or equal to the first light intensity threshold, the method 200 proceeds to operation 226. In operation 226 coming from operation 224, a determination is made that the mobile device is indoors at a medium confidence level. In response to a determination that the light detected by the light sensor is greater than the first light intensity threshold, the method 200 proceeds to operation 208. In operation 208 coming from operation 224, a determination is made that the mobile device is outdoors at a medium confidence level.

In operation 228, the light detected by the light sensor is compared with a second light intensity threshold. The second light intensity threshold is less than the first light intensity threshold. In some embodiments, the second light intensity threshold is adjusted based on a location of the mobile device. For example, if the mobile device is located within a city a light intensity expected to be detected outdoors is increased due to expected store lights and other lighting. Whereas, in a rural area a lower level of ambient light outdoors is expected. In some embodiments, the second light intensity threshold is six (6) lux.

In response to a determination that the light detected by the light sensor is less than the second light intensity threshold, the method 200 proceeds to operation 208. In operation 208 coming from operation 228, a determination is made that the mobile device is outdoors at a medium confidence level. In response to a determination that the light detected by the light sensor is greater than or equal to the second light intensity threshold, the method 200 proceeds to operation 232. In operation 232 coming from operation 228, a determination is made that the mobile device is indoors at a medium confidence level.

The method 200 further includes operation 230 in which a determination is made regarding whether the mobile device is currently charging. In some embodiments, the determination regarding whether the mobile device is currently charging is based on whether the mobile device is currently connected to an alternating current (AC) charging source. Direct current (DC) charging sources are useable both indoors and outdoors, so precision of a determination based on a DC charging source is less reliable than a determination based on an AC charging source, in some instances. In some embodiments, a charging status of the mobile device is determined based on monitoring a state of charge (SOC) of a battery of the mobile device.

In response to a determination that the mobile device is currently charging, the method 200 proceeds to operation 232. In operation 232 coming from operation 230, a determination is made that the mobile device is indoors at a medium confidence level. In response to a determination that the mobile device is not currently charging, the method 200 proceeds to operation 234.

In operation 234 a determination is made regarding movement of the mobile device. The determination regarding the movement of the mobile device is similar to the determination made in operation 206. However, in comparison with operation 206, in operation 234 a determination is made regarding whether a user carrying the mobile device is likely moving faster than a walking pace, e.g., running or jogging. In some embodiments, the mobile device is determined to be carried by a user that is moving faster than walking in response to a determination that a speed of the mobile device is greater than 1.5 m/s. In some embodiments, a condition of the operation 234 is satisfied in response to a determination that the speed of the mobile device ranges from 1.5 m/s to 10 m/s.

In response to a determination that the condition of operation 234 is satisfied, the method 200 proceeds to operation 236. In operation 326 coming from operation 234, a determination is made that the mobile device is outdoors with a low confidence level. In response to a determination that the condition of operation 234 is not satisfied the method 200 proceeds to operation 232. In operation 232 coming from operation 234, a determination is made that the mobile device is indoors with a low confidence level.

The method 200 further includes operation 238, in which a determination is made regarding whether a light sensor of the mobile device is available. The operation 238 is similar to the operation 220. In response to a determination that the light sensor is not available, the method 200 proceeds to operation 230. In response to a determination that the light sensor is available, the method 200 proceeds to operation 240.

In operation 240, a determination is made regarding a time of day at the location of the mobile device. The operation 240 is similar to the operation 222. In response to a determination that the time of day at the location of the mobile device is between sunrise and sunset, the method 200 proceeds to operation 244. In response to a determination that the time of day at the location of the mobile device is not between sunrise and sunset, the method 200 proceeds to operation 242.

In operation 242, the light detected by the light sensor is compared to the second light intensity threshold. The operation 242 is similar to the operation 228.

In response to a determination that the light detected by the light sensor is less than the second light intensity threshold, the method 200 proceeds to operation 208. In operation 208 coming from operation 242, a determination is made that the mobile device is outdoors at a medium confidence level. In response to a determination that the light detected by the light sensor is greater than or equal to the second light intensity threshold, the method 200 proceeds to operation 232. In operation 232 coming from operation 242, a determination is made that the mobile device is indoors at a medium confidence level.

In operation 244, the light detected by the light sensor is compared to the first light intensity threshold. The operation 244 is similar to the operation 224.

In response to a determination that the light detected by the light sensor is less than or equal to the first light intensity threshold, the method 200 proceeds to operation 232. In operation 232 coming from operation 244, a determination is made that the mobile device is indoors at a medium confidence level. In response to a determination that the light detected by the light sensor is greater than the first light intensity threshold, the method 200 proceeds to operation 208. In operation 208 coming from operation 244, a determination is made that the mobile device is outdoors at a medium confidence level.

One of ordinary skill in the art would recognize that additional operations are included in method 200 in some embodiments. For example, in some embodiments, a determination of a type of charging of the mobile device is included in the method 200. In some embodiments, at least one operation is omitted from the method 200. For example, in some embodiments, the operation 202 for initializing the sensors is omitted from the method 200. In some embodiments, an order of operations of the method 200 is adjusted. For example, in some embodiments, operation 210, 220 and/or 238 is performed prior to operation 206 to determine what types of sensors are available for determining the location of the mobile device.

The method 200 helps a telecommunication service provider differentiate service issues associated with problems in the network from service issues associated with a mobile device being located indoors. By combining both a predicted location of the mobile device and a confidence level of the prediction, the method 200 is able to advise the service provider and allow the service provider to determine a level of risk acceptance regarding whether to dispatch a service or maintenance crew. For example, one service provider would send out a service or maintenance crew in response to any determination that the mobile device is outdoors regardless of confidence level; while another service provider would only dispatch the service or maintenance crew if the confidence level is a medium level or high level.

Table 1 below provides information related to prediction results and confidence levels for different combinations of detected information from sensors of the mobile device. The values used for thresholds in Table 1 are mere examples and are not intended to limit the scope of this description or override discussions of different thresholds or adjusting thresholds above.

TABLE 1

| User Activity | Satellites Detected | Location Accuracy (m) | Light Intensity (lux) | Location Source | Charging State | Confidence | Result |
|---|---|---|---|---|---|---|---|
| Bicycle or driving | | | | | | High | Outdoor |
| | | | >2,000 | | | High | Outdoor |
| | ≤7 | | <2,000 | | | Medium | Indoor |
| | >7 | | <2,000 | | | Medium | Outdoor |
| | | >10.0 | <2,000 | GPS | | Medium | Indoor |
| | | <10.0 | >2,000 | GPS | | Medium | Outdoor |
| | | | <2,000 | Network | | Medium | Indoor |
| | | | <2,000 | | AC Charging | Medium | Indoor |
| | <12 | | <6 | | | Medium | Indoor |
| | ≤7 | | | | AC Charging | Medium | Indoor |
| | | >10.0 | <2,000 | GPS | AC Charging | Medium | Indoor |
| | ≤7 | | >6 | | | Medium | Indoor |
| | | >10.0 | >6 | GPS | | Medium | Indoor |
| | >7 | | | | | Low | Outdoor |
| | | | | Network | AC Charging | Low | Indoor |
| | | | >6 | | AC Charging | Low | Indoor |
| Running | | | | | | Low | Outdoor |

Figure 3:
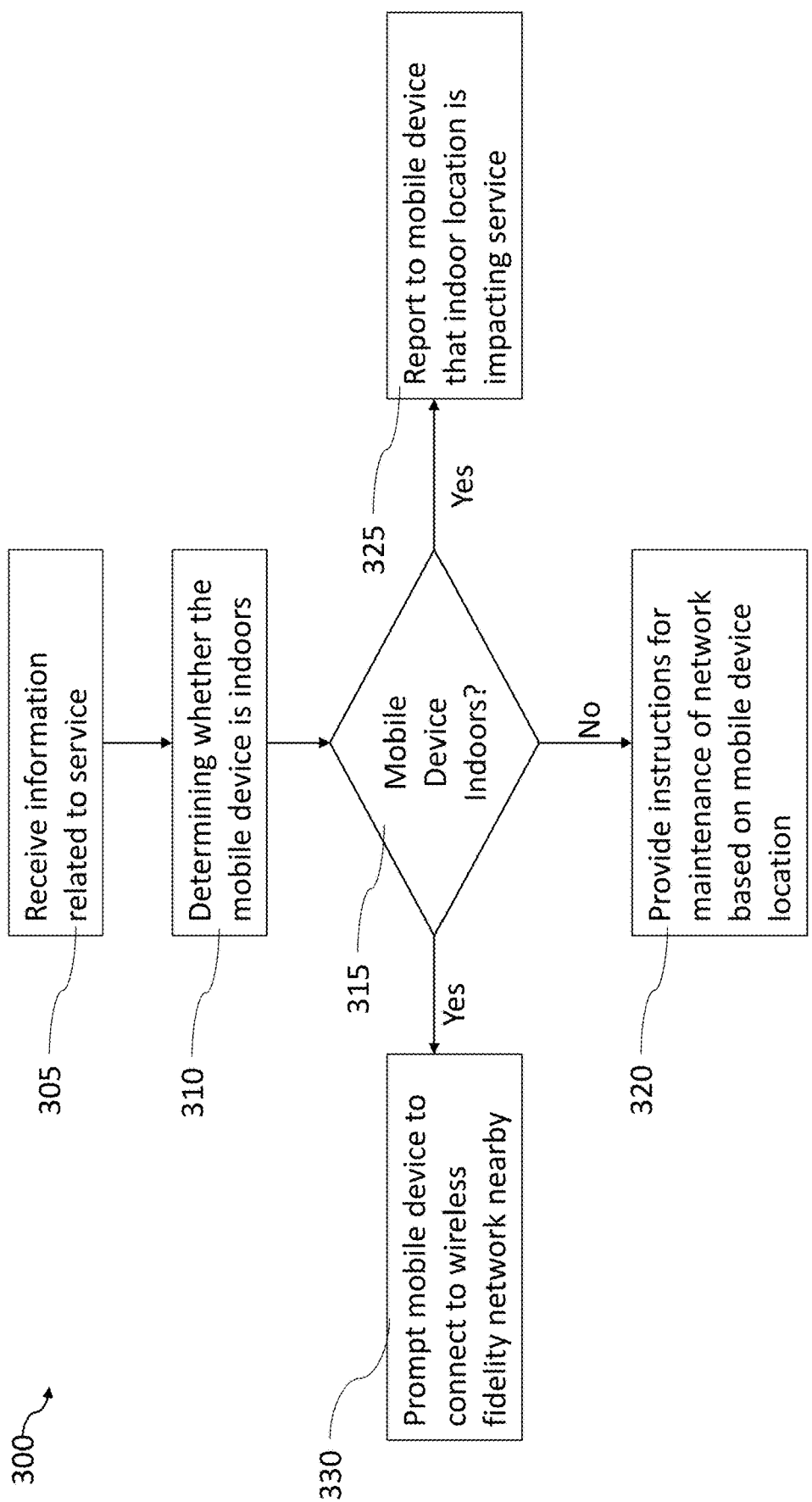
FIG. 3 is a flowchart of a method of responding to information related to service of a telecommunication network in accordance with some embodiments.

FIG. 3 is a flowchart of a method 300 of responding to information related to service of a telecommunication network in accordance with some embodiments. The method 300 is usable by a service provider in combination with method 200 in order to help determine how to respond to information related to service of the telecommunication network.

The method 300 includes an operation 305 in which information related to service of the telecommunication network is received. In some embodiments, the information is received from a user of a mobile device. In some embodiments, the information is received by monitoring KPIs of the telecommunication network.

In operation 310, a determination is made regarding whether the mobile device is indoors. In some embodiments, the determination is made in association with determining a confidence level of the determination. In some embodiments, the determination is made using method 200 (FIG. 2). In some embodiments, the determination is made based on sensors within the mobile device. In some embodiments, the determination is made by the mobile device. In some embodiments, the determination is made using a device external to the mobile device based on information received from the mobile device.

In operation 315, the method 300 determines whether the mobile device is indoors based on the results of operation 310. In some embodiments, the operation 315 determines that the mobile device is indoors regardless of a confidence level of the determination in operation 310. In some embodiments, the operation 315 determines the mobile device is indoors only with a confidence level threshold, e.g., medium confidence level or higher.

In response to a determination that the mobile device is not indoors, the method 300 proceeds to operation 320. In response to a determination that the mobile device is indoors, the method 300 proceeds to at least one of operation 325 or operation 330. In some embodiments, both operation 325 and operation 330 are performed. In some embodiments, only one of operation 325 or operation 330 is performed. Which operation or operations is performed is determined by a preference of the service provider.

In operation 320, the service provider issues instructions for maintenance or service of the network based on the mobile device location. In some embodiments, the mobile device location is determined based on information obtained during implementation of operation 310. In some embodiments, the instructions include at least one of adjusting an angle of an antenna of a base station, checking power supply of a base station, replace hardware of a base station or other suitable maintenance or service instructions for improving telecommunication service at the location of the mobile device. In some embodiments, the instructions are generated automatically without user interaction.

In operation 325, a report is sent to the mobile device that the mobile device was detected as being indoors and that being indoors is likely impacting service. In some embodiments, the report includes an audio or visual alert on the mobile device. In some embodiments, the report includes a request to take the mobile device outdoors to determine whether service improves. In some embodiments, the report is automatically displayed on the mobile device without user interaction.

In operation 330, a prompt is sent to the mobile device to connect to a nearby wireless fidelity (WiFi) network. In some embodiments, the prompt includes an audio or visual alert on the mobile device. In some embodiments, the prompt includes a name of any nearby WiFi network that is known at the time the prompt is sent. In some embodiments, the prompt provides a user with a link to select for connecting to a nearby WiFi network. In some embodiments, the prompt is displayed on the mobile device automatically without user interaction.

In some embodiments, additional operations are performed during method 300. For example, in some embodiments, KPIs from other nearby mobile devices are sampled to determine whether any service problems are noticed by other devices. In some embodiments, an order of operations of the method 300 is changed. For example, in some embodiments, operation 325 is combined with operation 330 and a same prompt is sent to the mobile device for implementing both operation 325 and operation 330.

Figure 4:
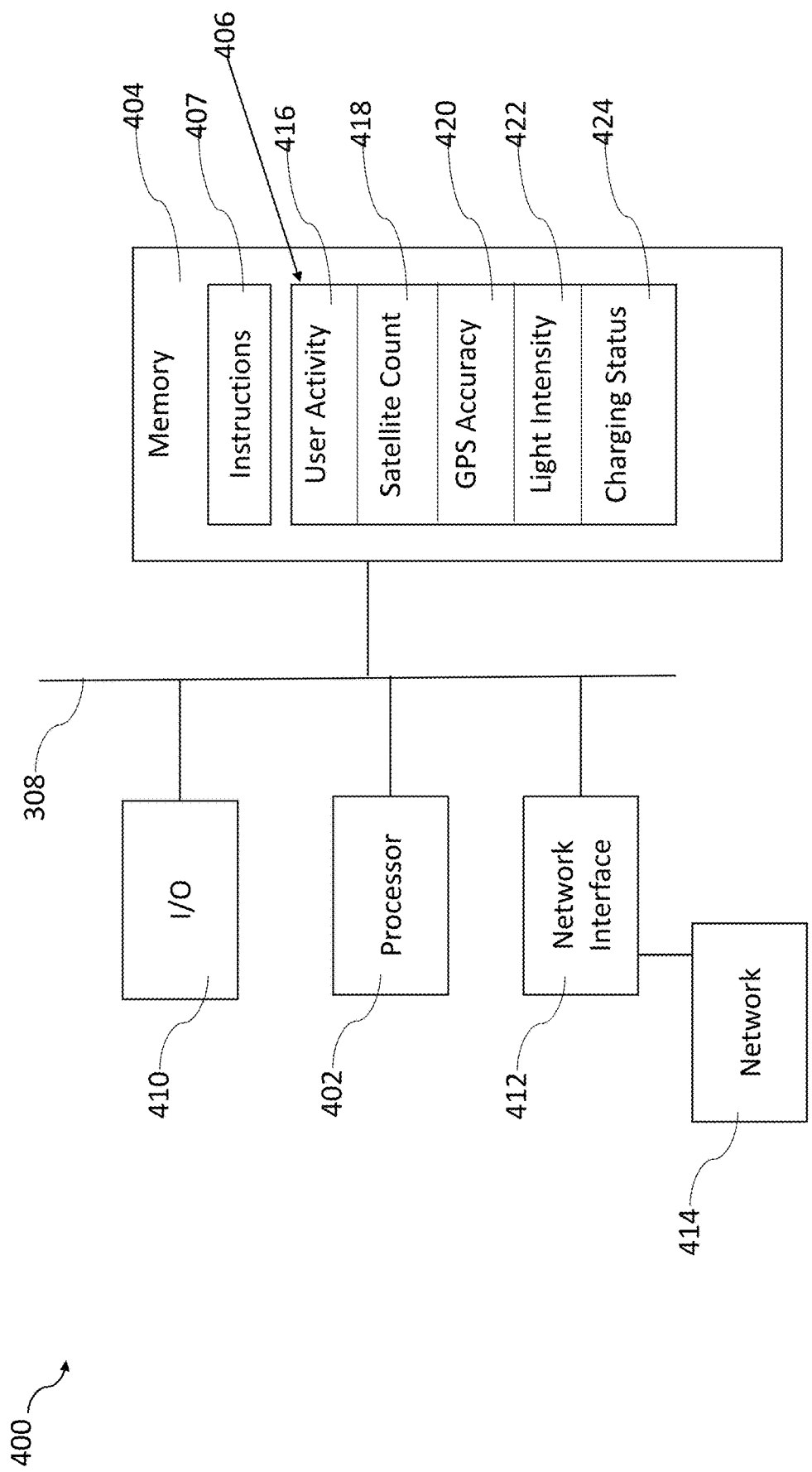
FIG. 4 is a block diagram of a system for implementing determination of a location of a mobile device in accordance with some embodiments.

FIG. 4 is a block diagram of a system 400 for implementing determination of a location of a mobile device in accordance with some embodiments. System 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with manufacturing machines for producing the memory array. The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting to external elements via network 414. The processor 402 is configured to execute the computer program code 406 encoded in the computer readable storage medium 404 in order to cause system 400 to be usable for performing a portion or all of the operations as described in method 200 (FIG. 2) or method 300 (FIG. 3).

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 404 stores the computer program code 506 configured to cause system 400 to perform a portion or all of the operations as described in method 200 (FIG. 2) or method 300 (FIG. 3). In some embodiments, the storage medium 404 also stores information for performing a portion or all of the operations as described in method 200 (FIG. 2) or method 300 (FIG. 3) as well as information generated during performing a portion or all of the operations as described in method 200 (FIG. 2) or method 300 (FIG. 3), such as a user activity parameter 416, a satellite count parameter 418, a GPS accuracy parameter 420, a light intensity parameter 422, a charging status parameter 424 and/or a set of executable instructions to perform a portion or all of the operations as described in method 200 (FIG. 2) or method 300 (FIG. 3).

In some embodiments, the storage medium 404 stores instructions 407 for interfacing with external devices. The instructions 407 enable processor 402 to generate and receive instructions readable by the external devices to effectively perform a portion or all of the operations as described in method 200 (FIG. 2) or method 300 (FIG. 3).

System 400 includes I/O interface 410. I/O interface 410 is coupled to external circuitry. In some embodiments, I/O interface 410 includes a keyboard, keypad, mouse, trackball, trackpad, and/or cursor direction keys for communicating information and commands to processor 402.

System 400 also includes network interface 412 coupled to the processor 402. Network interface 412 allows system 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, or IEEE-1394. In some embodiments, method 200 (FIG. 2) or method 300 (FIG. 3) is implemented in two or more systems 400, and information is exchanged between different systems 400 via network 414.

An aspect of this description relates to a mobile device. The mobile device includes a plurality of sensors. The mobile device further includes a non-transitory computer readable medium configured to store instructions thereon. The mobile device further includes a processor connected to the non-transitory computer readable medium. The processor is configured to execute the instructions for receiving first sensor data from a first sensor of the plurality of sensors. The processor is further configured to execute the instructions for determining whether the mobile device is outdoors based on a comparison between the received first sensor data and a first threshold. The processor is further configured to execute the instructions for receiving second sensor data from a second sensor of the plurality of sensors, wherein the second sensor is different from the first sensor. The processor is further configured to execute the instructions for determining whether the mobile device is outdoors based on a comparison between the received second data and a second threshold in response to the comparison between the received first sensor data and the first threshold being inconclusive. The processor is further configured to execute the instructions for determining a confidence level of a determination of whether the mobile device is outdoors based on which sensor of the plurality of sensors is used to determine whether the mobile device is outdoors. The processor is further configured to execute the instructions for instructing a transmitter to transmit the result of a determination of whether the mobile device is outdoors and the confidence level to a server. In some embodiments, the first sensor includes an accelerometer. In some embodiments, the processor is configured to execute the instructions for determining that the mobile device is outdoors in response to the accelerometer indicating movement of the mobile device above the first threshold. In some embodiments, the second sensor includes a global positioning system (GPS) sensor. In some embodiments, the processor is configured to execute the instructions for determining that the mobile device is outdoors in response to a determination that a number of satellites accessible by the GPS exceeds the second threshold. In some embodiments, the processor is configured to execute the instructions for determining that the mobile device is outdoors in response to a determination that a number of satellites accessible by the GPS exceeds the second threshold and a positional accuracy of the GPS exceeding a third threshold. In some embodiments, the processor is configured to execute the instructions for determining that the mobile device is indoors in response to a determination that a number of satellites accessible by the GPS is less than the second threshold and a positional accuracy of the GPS exceeding a third threshold. In some embodiments, the processor is configured to execute the instructions for receiving third sensor data from a third sensor of the plurality of sensors; and determining whether the mobile device is outdoors based on a comparison between the received third data and a third threshold in response to (a) the comparison between the received first sensor data and the first threshold being inconclusive, and (b) the comparison between the second sensor data and the second threshold being inconclusive. In some embodiments, the third sensor includes a light detector. In some embodiments, the processor is configured to execute the instructions for determining that the mobile device is outdoors in response to a determination that the third sensor data exceeds the third threshold and a time of day at a position of the mobile device is within a pre-defined range. In some embodiments, the pre-defined range is from sunrise to sunset. In some embodiments, the processor is configured to execute the instructions for determining that the mobile device is indoors in response to a determination that the third sensor data is less than the third threshold and a time of day at a position of the mobile device is within a pre-defined range. In some embodiments, the third sensor includes a charging sensor configured to detect whether the mobile device is in a charging state. In some embodiments, the processor is configured to execute the instructions for determining a type of charging in response to a determination that the mobile device is in the charging state. In some embodiments, the processor is configured to determine whether the mobile device is outdoors based on the determined type of charging.

An aspect of this description relates to a method. The method includes receiving first sensor data from a first sensor of a plurality of sensors of a mobile device. The method further includes determining whether the mobile device is outdoors based on a comparison between the received first sensor data and a first threshold. The method further includes receiving second sensor data from a second sensor of the plurality of sensors, wherein the second sensor is different from the first sensor. The method further includes determining whether the mobile device is outdoors based on a comparison between the received second data and a second threshold in response to the comparison between the received first sensor data and the first threshold being inconclusive. The method further includes determining a confidence level of a determination of whether the mobile device is outdoors based on which sensor of the plurality of sensors is used to determine whether the mobile device is outdoors. The method further includes transmitting the result of a determination of whether the mobile device is outdoors and the confidence level to a server. In some embodiments, determining the confidence level includes determining the confidence level is high in response to a determination that the first sensor data exceeds the first threshold. In some embodiments, determining the confidence level includes determining the confidence level is low in response to a determination that (a) the first sensor data being less than the first threshold, (b) the second sensor data is less than the second threshold, and (c) at third sensor of the plurality of sensors is unavailable. In some embodiments, the method further includes receiving third sensor data from a third sensor of the plurality of sensors; and determining whether the mobile device is outdoors based on a comparison between the received third data and a third threshold in response to (a) the comparison between the received first sensor data and the first threshold being inconclusive, and (b) the comparison between the second sensor data and the second threshold being inconclusive.

An aspect of this description relates to a non-transitory computer readable medium configured to store instructions for causing a processor executing the instructions to implement a method. The instruction cause the processor to receive first sensor data from a first sensor of a plurality of sensors of a mobile device. The instructions further cause the processor to determine whether the mobile device is outdoors based on a comparison between the received first sensor data and a first threshold. The instructions further cause the processor to receive second sensor data from a second sensor of the plurality of sensors, wherein the second sensor is different from the first sensor. The instructions further cause the processor to determine whether the mobile device is outdoors based on a comparison between the received second data and a second threshold in response to the comparison between the received first sensor data and the first threshold being inconclusive. The instructions further cause the processor to determine a confidence level of a determination of whether the mobile device is outdoors based on which sensor of the plurality of sensors is used to determine whether the mobile device is outdoors. The instructions further cause the processor to instruct a transmitter to transmit the result of a determination of whether the mobile device is outdoors and the confidence level to a server.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A mobile device comprising:
    a plurality of sensors:
    a non-transitory computer readable medium configured to store instructions thereon; and
    a processor connected to the non-transitory computer readable medium, wherein the processor is configured to execute the instructions for:
        receiving first sensor data from a first sensor of the plurality of sensors;
        determining whether the mobile device is outdoors based on a comparison between the received first sensor data and a first threshold;
        receiving second sensor data from a second sensor of the plurality of sensors, wherein the second sensor is different from the first sensor;
        determining whether the mobile device is outdoors based on a comparison between the received second data and a second threshold in response to the comparison between the received first sensor data and the first threshold being inconclusive;
        determining a confidence level of a determination of whether the mobile device is outdoors based on which sensor of the plurality of sensors is used to determine whether the mobile device is outdoors; and
        instructing a transmitter to transmit the result of a determination of whether the mobile device is outdoors and the confidence level to a server.

2. The mobile device of claim 1, wherein the first sensor comprises an accelerometer.

3. The mobile device of claim 2, wherein the processor is configured to execute the instructions for determining that the mobile device is outdoors in response to the accelerometer indicating movement of the mobile device above the first threshold.

4. The mobile device of claim 2, wherein the second sensor comprises a global positioning system (GPS) sensor.

5. The mobile device of claim 4, wherein the processor is configured to execute the instructions for determining that the mobile device is outdoors in response to a determination that a number of satellites accessible by the GPS exceeds the second threshold.

6. The mobile device of claim 4, wherein the processor is configured to execute the instructions for determining that the mobile device is outdoors in response to a determination that a number of satellites accessible by the GPS exceeds the second threshold and a positional accuracy of the GPS exceeding a third threshold.

7. The mobile device of claim 4, wherein the processor is configured to execute the instructions for determining that the mobile device is indoors in response to a determination that a number of satellites accessible by the GPS is less than the second threshold and a positional accuracy of the GPS exceeding a third threshold.

8. The mobile device of claim 1, wherein the processor is configured to execute the instructions for:
    receiving third sensor data from a third sensor of the plurality of sensors; and
    determining whether the mobile device is outdoors based on a comparison between the received third data and a third threshold in response to (a) the comparison between the received first sensor data and the first threshold being inconclusive, and (b) the comparison between the second sensor data and the second threshold being inconclusive.

9. The mobile device of claim 8, wherein the third sensor comprises a light detector.

10. The mobile device of claim 9, wherein the processor is configured to execute the instructions for determining that the mobile device is outdoors in response to a determination that the third sensor data exceeds the third threshold and a time of day at a position of the mobile device is within a pre-defined range.

11. The mobile device of claim 10, wherein the pre-defined range is from sunrise to sunset.

12. The mobile device of claim 9, wherein the processor is configured to execute the instructions for determining that the mobile device is indoors in response to a determination that the third sensor data is less than the third threshold and a time of day at a position of the mobile device is within a pre-defined range.

13. The mobile device of claim 8, wherein the third sensor comprises a charging sensor configured to detect whether the mobile device is in a charging state.

14. The mobile device of claim 13, wherein the processor is configured to execute the instructions for determining a type of charging in response to a determination that the mobile device is in the charging state.

15. The mobile device of claim 14, wherein the processor is configured to determine whether the mobile device is outdoors based on the determined type of charging.

16. A method comprising:
    receiving first sensor data from a first sensor of a plurality of sensors of a mobile device;
    determining whether the mobile device is outdoors based on a comparison between the received first sensor data and a first threshold;

receiving second sensor data from a second sensor of the plurality of sensors, wherein the second sensor is different from the first sensor;

determining whether the mobile device is outdoors based on a comparison between the received second data and a second threshold in response to the comparison between the received first sensor data and the first threshold being inconclusive;

determining a confidence level of a determination of whether the mobile device is outdoors based on which sensor of the plurality of sensors is used to determine whether the mobile device is outdoors; and transmitting the result of a determination of whether the mobile device is outdoors and the confidence level to a server.

17. The method of claim 16, wherein determining the confidence level comprises determining the confidence level is high in response to a determination that the first sensor data exceeds the first threshold.

18. The method of claim 16, wherein determining the confidence level comprises determining the confidence level is low in response to a determination that (a) the first sensor data being less than the first threshold, (b) the second sensor data is less than the second threshold, and (c) at third sensor of the plurality of sensors is unavailable.

19. The method of claim 16, further comprising:

receiving third sensor data from a third sensor of the plurality of sensors; and determining whether the mobile device is outdoors based on a comparison between the received third data and a third threshold in response to (a) the comparison between the received first sensor data and the first threshold being inconclusive, and (b) the comparison between the second sensor data and the second threshold being inconclusive.

20. A non-transitory computer readable medium configured to store instructions for causing a processor executing the instructions to implement a method comprising:

receiving first sensor data from a first sensor of a plurality of sensors of a mobile device;

determining whether the mobile device is outdoors based on a comparison between the received first sensor data and a first threshold;

receiving second sensor data from a second sensor of the plurality of sensors, wherein the second sensor is different from the first sensor;

determining whether the mobile device is outdoors based on a comparison between the received second data and a second threshold in response to the comparison between the received first sensor data and the first threshold being inconclusive;

determining a confidence level of a determination of whether the mobile device is outdoors based on which sensor of the plurality of sensors is used to determine whether the mobile device is outdoors; and instructing a transmitter to transmit the result of a determination of whether the mobile device is outdoors and the confidence level to a server.

* * * * *